(12) United States Patent
Hunter et al.

(10) Patent No.: US 7,809,523 B2
(45) Date of Patent: Oct. 5, 2010

(54) APPARATUS AND METHOD OF MEASURING WORKPIECES

(75) Inventors: Stephan Paul Hunter, Bristol (GB); Geoffrey McFarland, Wotton-under-Edge (GB); Kevyn Barry Jonas, Bristol (GB); Khaled Mamour, Bristol (GB)

(73) Assignee: Renishaw PLC, Wotton-under-Edge (GB)

( * ) Notice: Subject to any disclaimer, the term of this patent is extended or adjusted under 35 U.S.C. 154(b) by 33 days.

(21) Appl. No.: 12/224,654

(22) PCT Filed: Mar. 23, 2007

(86) PCT No.: PCT/GB2007/001064

§ 371 (c)(1),
(2), (4) Date: Sep. 3, 2008

(87) PCT Pub. No.: WO2007/107776

PCT Pub. Date: Sep. 27, 2007

(65) Prior Publication Data

US 2009/0030648 A1    Jan. 29, 2009

(30) Foreign Application Priority Data

Mar. 23, 2006    (GB) .................................. 0605796.2

(51) Int. Cl.
G01B 5/20 (2006.01)
G01B 5/00 (2006.01)
(52) U.S. Cl. ......................................... 702/168; 33/503
(58) Field of Classification Search .................. 702/95, 702/152, 168; 33/503, 552
See application file for complete search history.

(56) References Cited

U.S. PATENT DOCUMENTS 4,631,834 A    12/1986    Hayashi et al.

(Continued)

FOREIGN PATENT DOCUMENTS

EP    0 866 390 A1    9/1998

(Continued)

OTHER PUBLICATIONS

Yau et al., "Path Planning for Automated Dimensional Inspection Using Coordinate Measuring Machines," *Proceedings of the International Conference on Robotics and Automation*, Apr. 9-11, 1991, pp. 1934-1939.

(Continued)

*Primary Examiner*—Bryan Bui
(74) *Attorney, Agent, or Firm*—Oliff & Berridge, PLC

(57) ABSTRACT

A method and apparatus for measuring a surface using a surface sensing device mounted on a scanning head on a member of a coordinate positioning apparatus. The coordinate positioning apparatus may be operated to produce relative movement between the scanning head and the surface profile and the scanning head includes a drive for producing rotational movement of the surface sensing probe about one or more axis. A desired measurement profile on the surface which the surface sensing device will track and the desired motion of the orientation of the surface sensing device as the surface' sensing device follows the measurement profile are defined. This data is used to derive the required path of the relative motion between the member of the coordinate positioning apparatus and the surface, such that the surface sensing device prescribes a trajectory along the measurement profile.

18 Claims, 14 Drawing Sheets

U.S. PATENT DOCUMENTS

| | | | | |
|---|---|---|---|---|
| 4,811,253 A | * | 3/1989 | Johns | 702/168 |
| 4,888,877 A | | 12/1989 | Enderle et al. | |
| 5,189,806 A | | 3/1993 | McMurtry et al. | |
| 5,251,156 A | | 10/1993 | Heier et al. | |
| 6,154,713 A | | 11/2000 | Peter et al. | |
| 6,546,643 B2 | | 4/2003 | Lotze et al. | |
| 7,165,335 B2 | | 1/2007 | McMurtry | |
| 7,293,365 B2 | | 11/2007 | McMurtry et al. | |
| 7,503,125 B2 | | 3/2009 | Jordil et al. | |
| 7,647,706 B2 | | 1/2010 | Jordil et al. | |
| 2006/0053646 A1 | | 3/2006 | McFarland | |
| 2009/0030648 A1 | | 1/2009 | Hunter et al. | |
| 2009/0055118 A1 | * | 2/2009 | McLean et al. | 702/95 |

FOREIGN PATENT DOCUMENTS

| | | |
|---|---|---|
| JP | A-63-206607 | 8/1988 |
| WO | WO 90/07097 A1 | 6/1990 |
| WO | WO 03/095943 A1 | 11/2003 |

OTHER PUBLICATIONS

Office Action from application mailed May 21, 2010.

* cited by examiner

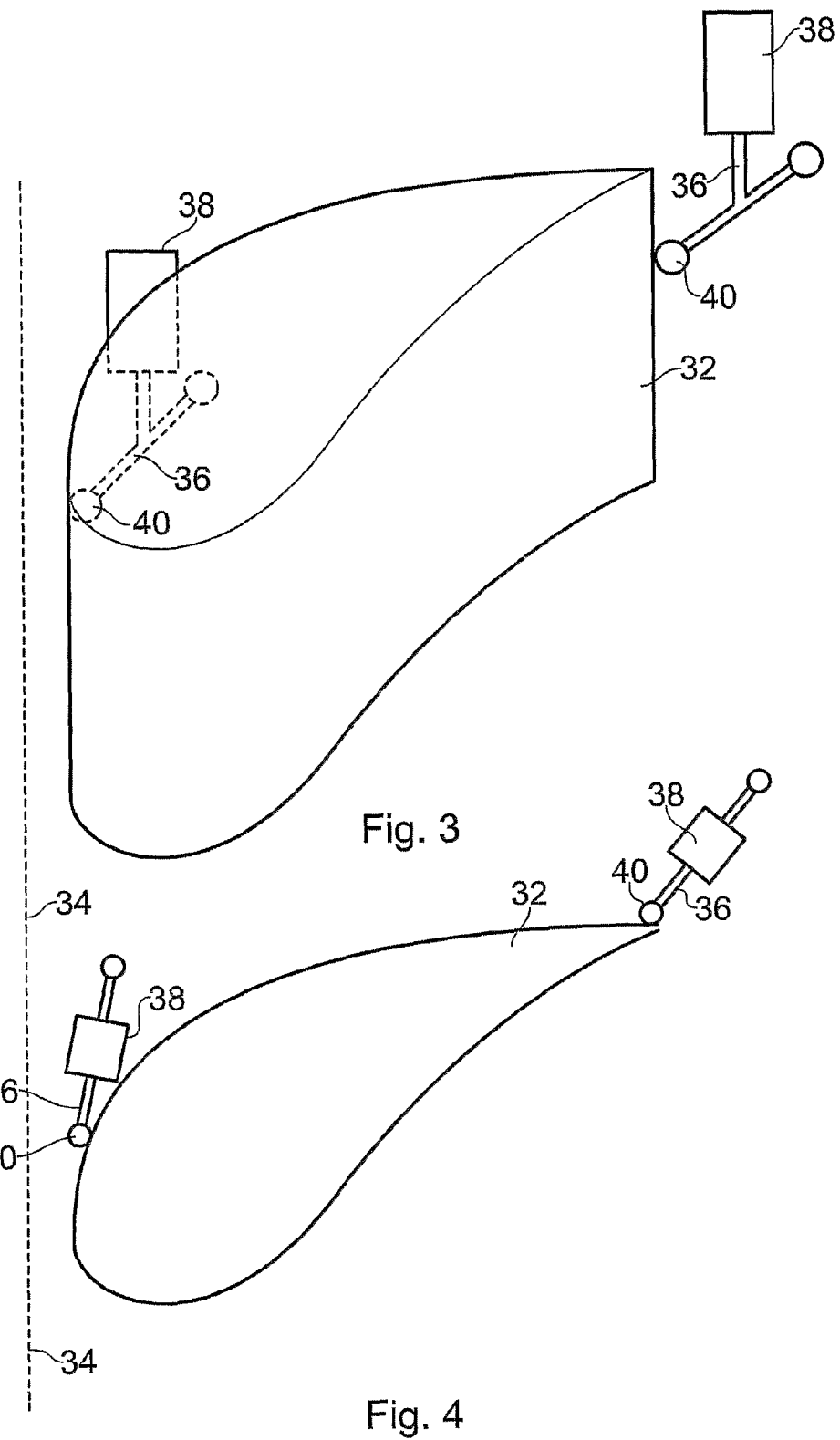

APPARATUS AND METHOD OF MEASURING WORKPIECES

BACKGROUND

The present invention relates to a method of measuring the surface of a workpiece using a motorised scanning head mounted on a coordinate positioning apparatus such as a coordinate measuring machine (CMM), machine tool, manual coordinate measuring arm and inspection robot.

It is known from International Patent Application No. WO90/07097 to mount a motorised scanning head on a coordinate positioning machine. The motorised scanning head enables a stylus mounted on the motorised scanning head to be rotated about two orthogonal axes. The stylus may be positioned angularly about these two axes whilst the motorised scanning head can be positioned by the coordinate positioning machine in any position within the working volume of the machine.

Such a motorised scanning head provides a coordinate positioning machine with greater scanning flexibility because the motorised scanning head can position the stylus in many different orientations.

This application discloses measurement sequences in which simple movement of the coordinate positioning apparatus is combined with movement of the motorised scanning head to measure regularly shaped parts. For example a bore is measured by moving the quill of the CMM along a centre line while the motorised scanning head moves the stylus tip in a circular profile thus resulting in a helical motion. Likewise, a plane surface may be measured by moving the quill of the CMM at constant speed parallel to the surface as the motorised scanning head performs a sweeping motion.

This also discloses scanning the surface of a cone, placed with its axis parallel to the Z axis of a CMM. The quill is driven in a circular path while the motors of the scanning head cause the surface sensing device to be biased against the cone about the Z axis.

In traditional methods of measuring workpieces, the stylus tip position is at a fixed offset from the quill and is known from probe calibration.

With a 5 axis system, the stylus tip position is dependent on the angles of the scanning head (i.e. about axes A1 and A2) and probe length, so the stylus tip position is constantly varying with respect to the quill position as the angles of the scanning head vary.

In this case the actual tip position is affected by the tolerances in the scanning head. Thus either the quill must be fixed and the stylus tip position allowed to vary from its nominal position to allow for these tolerances or visa versa.

SUMMARY

A first aspect of the present invention provides a method for measuring a surface using a surface sensing device mounted on a scanning head on a member of a coordinate positioning apparatus, wherein the coordinate positioning apparatus may be operated to produce relative movement between the scanning head and the surface profile and wherein the scanning head includes a drive for producing rotational movement of the surface sensing probe about one or more axis, the method comprising the following steps:
  (a) defining the desired measurement profile on the surface which the surface sensing device will track;
  (b) defining the desired motion of the orientation of the surface sensing device as the surface sensing device follows the measurement profile of step (a);
  (c) using the data determined in steps (a) and (b) to derive the required path of the relative motion between the member of the coordinate positioning apparatus and the surface, such that the surface sensing device prescribes a trajectory along the measurement profile.

The measurement profile of the surface sensing device may be linear or non linear.

The motion of the vector in step (b) may comprise a function which determines the vector during the motion of the surface sensing device along the measurement profile. The motion of the vector in step (b) may be determined by defining the vector at discrete points along the measurement profile and interpolating between them.

The motion of the vector in step (b) may be such that the vector varies relative to the surface normal.

The vector in step (b) may be chosen to position the surface sensing device so that it trails behind the head, is pushed ahead of the head or is aligned with the normal of the surface normal. There may be a transition from one type of vector to another.

The measurement path in step (a) and the motion of the vector in step (b) may be chosen to provide a desired relative motion between the member of the coordinate positioning apparatus and the surface.

The measurement profile of step (a) may be determined by determining two or more discrete measurement point on the surface profile. The measurement profile of step (a) may be defined by a function.

Motion in at least one axis may be frozen during part of measurement profile. Motion of the scanning head may be frozen during part of the measurement profile. Motion of the coordinate positioning machine may be frozen during part of the measurement profile.

The method may include the step of using the data from steps (a), (b) and (c) to measure a surface.

Rotational movement about at least one axis of the scanning head may be used to keep the surface sensing device within its measurement range. The scanning head may be served along a target vector to keep the surface sensing device within its measurement range. The relative motion of the between the member of the coordinate positioning apparatus and the surface may be used to keep the surface sensing device tracking along a desired plane of the surface.

A second aspect of the invention provides a computer program for programming a measurement path for a surface sensing device mounted on a scanning head on a member of a coordinate positioning apparatus, wherein the coordinate positioning apparatus may be operated to produce relative movement between the scanning head and the surface profile and wherein the scanning head includes a drive for producing rotational movement of the surface sensing probe about one or more axis, the computer programme comprising code adapted to perform the steps of any of claims 1-14 when executed on a computer.

Preferably the computer programme is provided on a carrier, such as a CD, USB stick or other medium, which when loaded onto a computer carries out the invention. The computer program may also be downloaded directly from the internet.

A third aspect of the invention provides apparatus for measuring a surface profile using a surface sensing device mounted on a scanning head on a member of a coordinate positioning apparatus, wherein the coordinate positioning apparatus may be operated to produce relative movement between the scanning head and the surface profile and wherein the scanning head includes a drive for producing rotational movement of the surface sensing probe about one or more axis, the apparatus comprising a computer for carrying out the following steps:

(a) defining the desired measurement profile on the surface which the surface sensing device will follow;

(b) defining the desired motion of the orientation of the surface sensing device as the surface sensing device follows the measurement profile of step (a);

(c) using the data determined in steps (a) and (b) to derive the required path of the relative motion between the member of the coordinate positioning apparatus and the surface, such that the surface sensing device prescribes a trajectory along the measurement profile.

The apparatus may include the step of using the data from steps (a), (b) and (c) to measure a surface.

BRIEF DESCRIPTION OF THE DRAWINGS

Examples of preferred embodiments of the invention will now be described with reference to the accompanying drawings wherein:

FIG. 3 is a perspective view of a turbine blade being measured with a crank stylus;

FIG. 4 is a plan view of the turbine blade of FIG. 3;

DETAILED DESCRIPTION OF EMBODIMENTS

Figure 1:
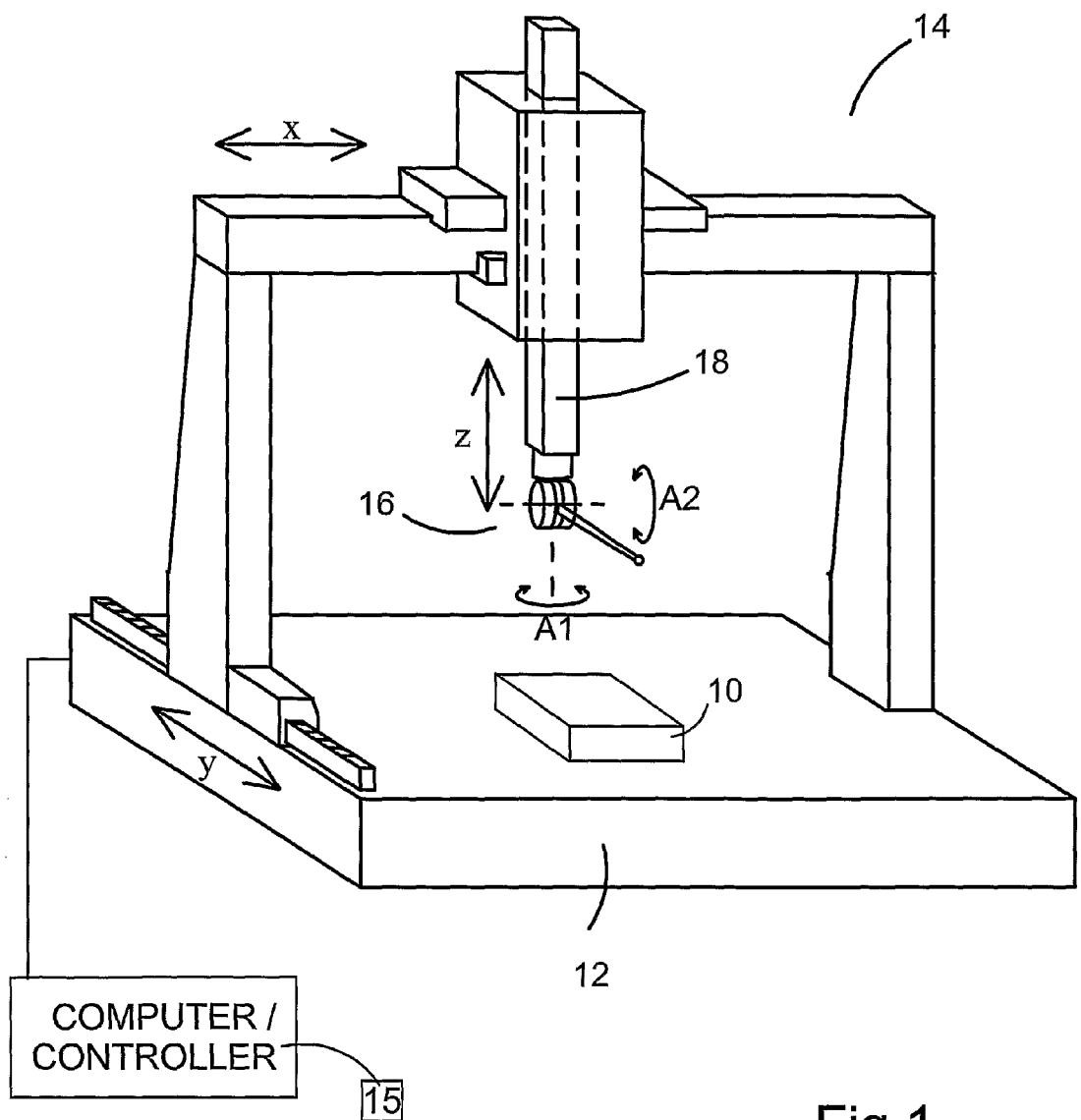
FIG. 1 is an elevation of a coordinate measuring machine including scanning apparatus according to the present invention.
Figure 2:
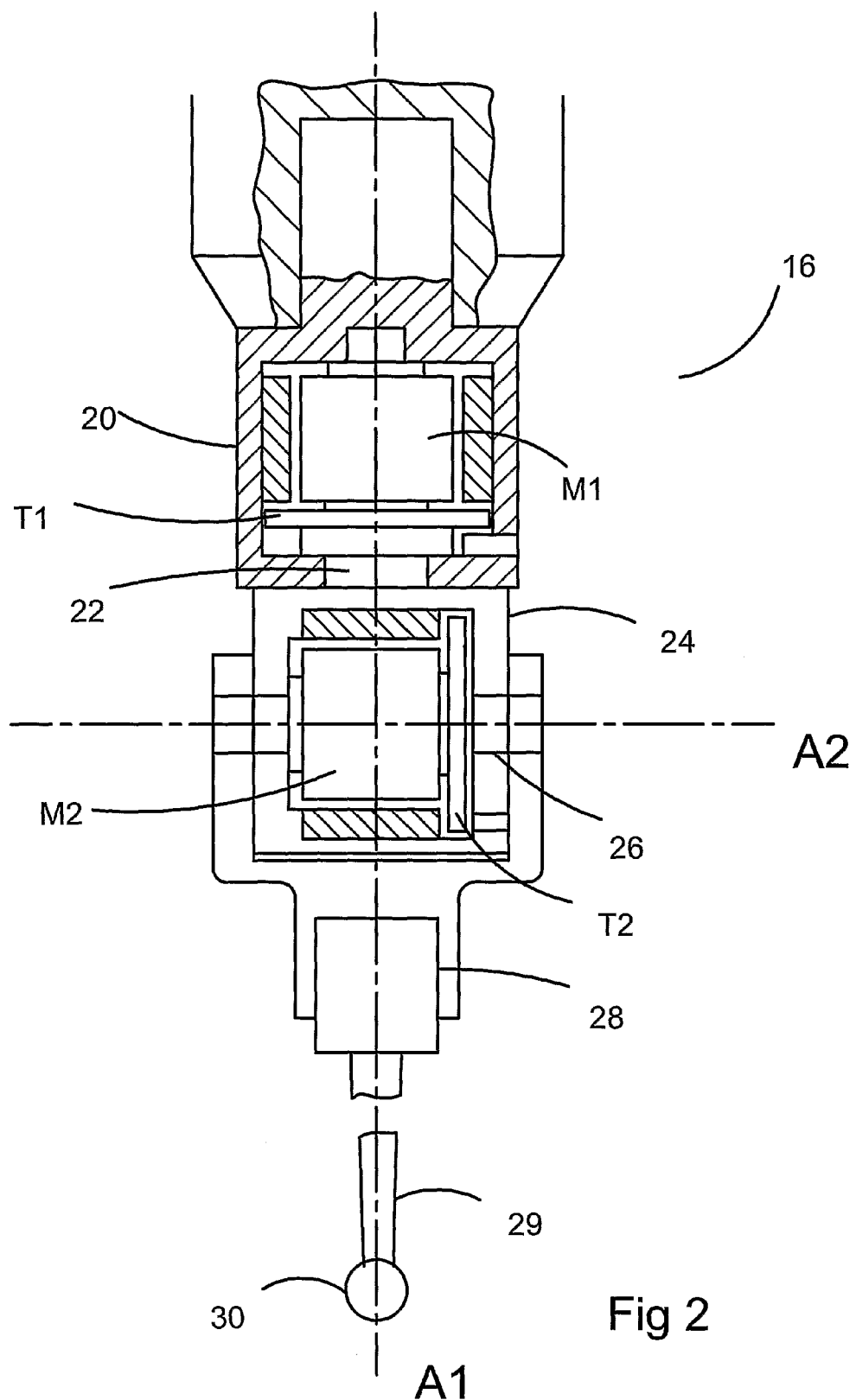
FIG. 2 is a cross-section of a motorised scanning head.

FIG. 1 illustrates a motorised scanning head mounted on a coordinate measuring machine (CMM). A workpiece 10 to be measured is mounted on a table 12 of the CMM 14 and a motorised scanning head 16 is mounted on a quill 18 of the CMM 14. The spindle is drivable in the directions X,Y,Z relative to the table by motors in a known manner. As illustrated in FIG. 2, the motorised scanning head 16 comprises a fixed part formed by a base or housing 20 supported by a movable part in the form of a shaft 22 rotatable by motor M1 relative to housing 20 about an axis A1. The shaft 22 is secured to a further housing 24 which in turn supports a shaft 26 rotatable by a motor M2 relative to the housing 24 about an axis A2 perpendicular to the axis A1.

A probe 28 with a stylus 29 having a workpiece contacting tip 30 is mounted onto the motorised scanning head. The arrangement is such that the motors M1,M2 of the head can position the workpiece contacting tip angularly about the axes A1 or A2 and the motors of the CMM can position the motorised scanning head linearly anywhere within three dimensional coordinate framework of the CMM to bring the stylus tip into a predetermined relationship with the surface being scanned.

Linear position transducers are provided on the CMM for measuring linear displacement of the scanning head and angular position transducers T1 and T2 are provided in the scanning head for measuring angular displacement of the stylus about the respective axes A1 and A2.

In the type of CMM illustrated in FIG. 1, relative movement between the quill and the workpiece is obtained by enabling the quill to move in three orthogonal directions. In other types of coordinate positioning apparatus, relative movement between the quill (or other member on which the motorised scanning head is mounted) and the workpiece may be obtained by movement of the quill, movement of the surface on which the workpiece is mounted (e.g. the table) or a combination of the above.

The probe has a deflectable stylus 29 and transducers in the probe measure the amount of stylus deflection. The probe may be two-dimensional e.g. sensing deflection in X and Y or three-dimensional e.g. sensing deflection in X,Y and Z. Alternatively a non-contact probe may be used (e.g. an optical, capacitance or inductance probe).

On a vertical arm CMM as shown in FIG. 1, the A1 axis of the scanning head 16 is nominally parallel to the CMM Z axis (which is along the spindle 18). The scanning head may rotate the probe continuously about this axis. The A2 axis of the scanning head is orthogonal to its A1 axis.

The motorised scanning head can position the surface sensing device in different orientations without recalibration of the head being required.

The positions of the CMM and scanning head are controlled by a control code which is provided on a computer which may be a bespoke piece of hardware i.e. a controller or a P.C. The computer may be programmed to move the CMM and scanning head along measurement paths. A computer 15 is illustrated in FIG. 1.

In some cases it is not possible to scan a part by moving the quill of the CMM around the perimeter of the part. The part may be located at the edge of the working volume, thus preventing the quill of the CMM to move all the way around it. Alternatively constraints of the part may mean access is not possible, for example when measuring a blade of a blisk (combined blade and disk), the CMM quill is constrained in some positions by the central disk and neighbouring blades.

FIGS. 3 and 4 illustrate a perspective and plan view respectively, of a turbine blade 32. In this example, access of the quill is restricted at one end of the turbine blade. The dashed line illustrates the boundary of possible motion of the CMM quill. This access problem can be overcome in traditional scanning methods by using a cranked stylus 36 on a measurement probe 38. The cranked stylus 36 enables the stylus tip 40 to access the part without the CMM quill moving across the boundary 34. However, it has the disadvantage that only half the turbine blade 32 can be measured with this cranked stylus 36. For the other half of the turbine blade 32 to be measured, the stylus must be replaced with another cranked stylus rotated by 180°. Alternatively a star stylus could be used.

Figure 5:
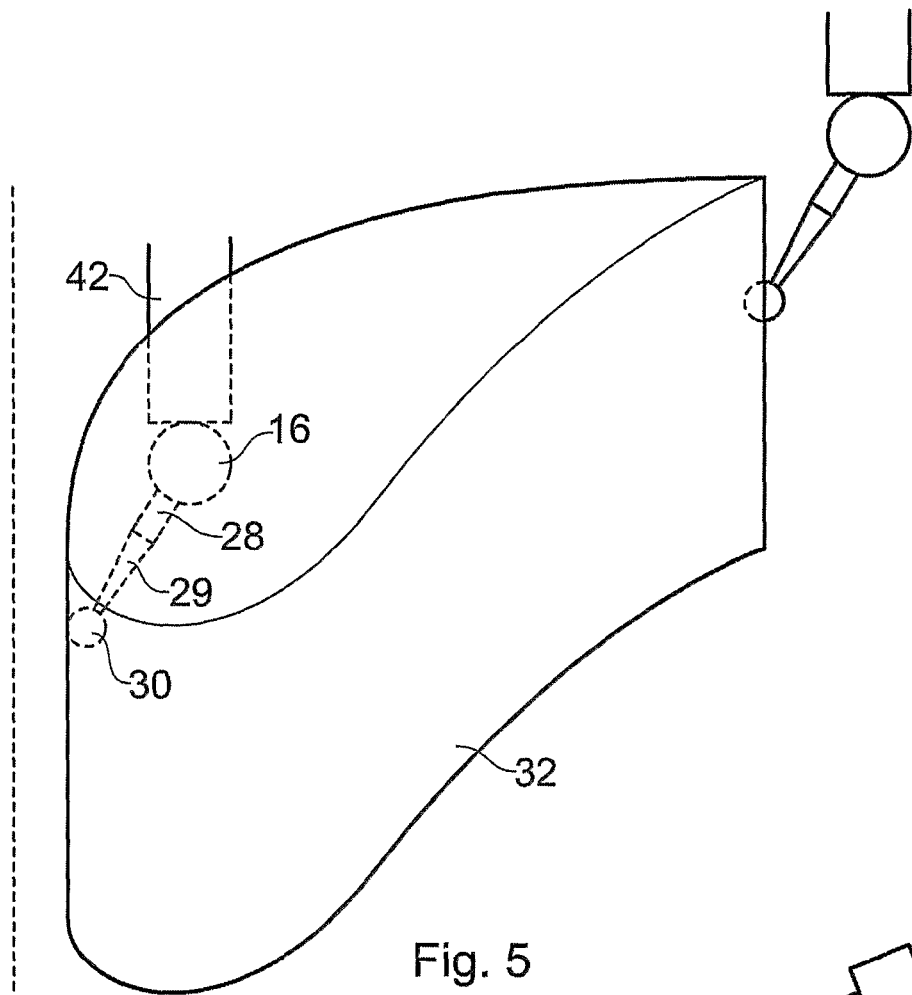
FIG. 5 is a perspective view of a turbine blade being measured according to the present invention.
Figure 6:
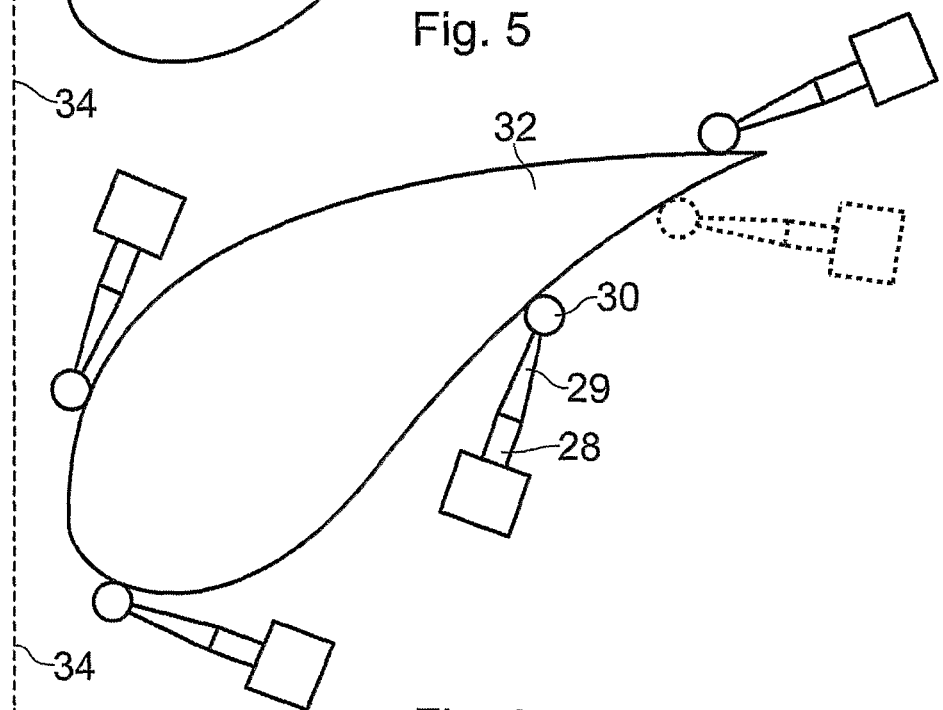
FIG. 6 is a plan view of the turbine blade of FIG. 5.

FIGS. 5 and 6 illustrate a perspective and plan view respectively of the same turbine blade 32 as illustrated in FIGS. 3 and 4. This turbine blade 32 is measured with a motorised scanning head on which is mounted a probe 28 with a deflectable stylus 29 and workpiece contacting tip 30.

During the scanning routine with the motorised scanning head 16, there are three sets of variables, comprising of the stylus tip position, the angle of the head and the position of the quill of the CMM.

The angle of the head can be chosen so that the part can be measured without the quill of the CMM needing to be positioned where access is impossible. Thus at one end of the turbine blade 32, where access is restricted, the head 16 is angled so that the quill of the CMM does not cross the boundary line 34. The angle of the head may change throughout the scan, allowing the whole profile of the part to be measured in one go.

The head angle may be chosen so that the stylus is dragged i.e. it trails behind the head, is pushed i.e. it is ahead of the head, or is straight i.e. is aligned with the normal to the part. There may be a transition between different head angles within a measurement path. For a two-dimensional probe, it may be preferable to angle the scanning head at a low angle. This has the advantage that the deflection is primarily in the XY plane of the probe. However, for a three-dimensional probe this restriction is not required.

The illustration in FIG. 6 shows the turbine blade being scanned in a clockwise direction. The stylus is shown being dragged as it leaves the narrow end and pushed as it approaches the wide end. The head angles and quill path are adjusted to enable the stylus to follow a transition between being dragged and being pushed as it approaches the wide end. In an alternative scanning regime, the stylus may be dragged as it approaches the narrow end and then pushed as it departs from the narrow end (as illustrated by the probe in dashed outline), thus avoiding the need for a transition in the head angles approaching the wide end. As there is no or very little change required in the head angles at the narrow end, the required quill motion at the narrow end is minimised. In choosing a scan regime, considerations such as path following accuracy, throughput and working volume are taken into account.

Of the three sets of variables the information of two are needed and a third can be calculated to achieve the desired scan path. It is preferable to choose the desired position of the stylus tip and the head angle and use this data to predict the position of the CMM quill.

In order to measure a point on a surface, coordinates of the surface sensing device in terms of position in space and orientation need to be defined. Conventionally this is done by specifying the five positions of the five drive axes (two in the head ad three in the CMM) which define the motion of the surface sensing device. However, in the present invention, the tip position and orientation of the surface sensing device are specified and the motion of the CMM drive axes can be derived.

Use of the stylus tip coordinate position to set the scan profile has the advantage that these coordinate positions are close to the desired measurements and thus it is beneficial for them to be as accurate as possible. In some applications it is important to keep the stylus tip in a plane, for example measuring turbine blades to Civil Aviation Authority standards. In other applications, such as gaskets, the scanning path is chosen to avoid features such as holes.

Defining the stylus tip coordinate positions also has the advantage that as the position of the stylus tip is known at all time (i.e. it has been defined) collisions between the stylus tip and part can be avoided.

Furthermore any offsets due to tolerances of the head and measurement system, for example stylus length tolerance and ease of programming etc, can be taken account of in the position of the CMM quill.

Use of the head angle in determining the scan path also has advantages. For some types of probe a range of desired head angles may be required, for example a two-dimension touch probe may require angle constraints for optimum measurement. Furthermore the head may be required to be angled at certain angles to maximise access to the part.

Figure 7:
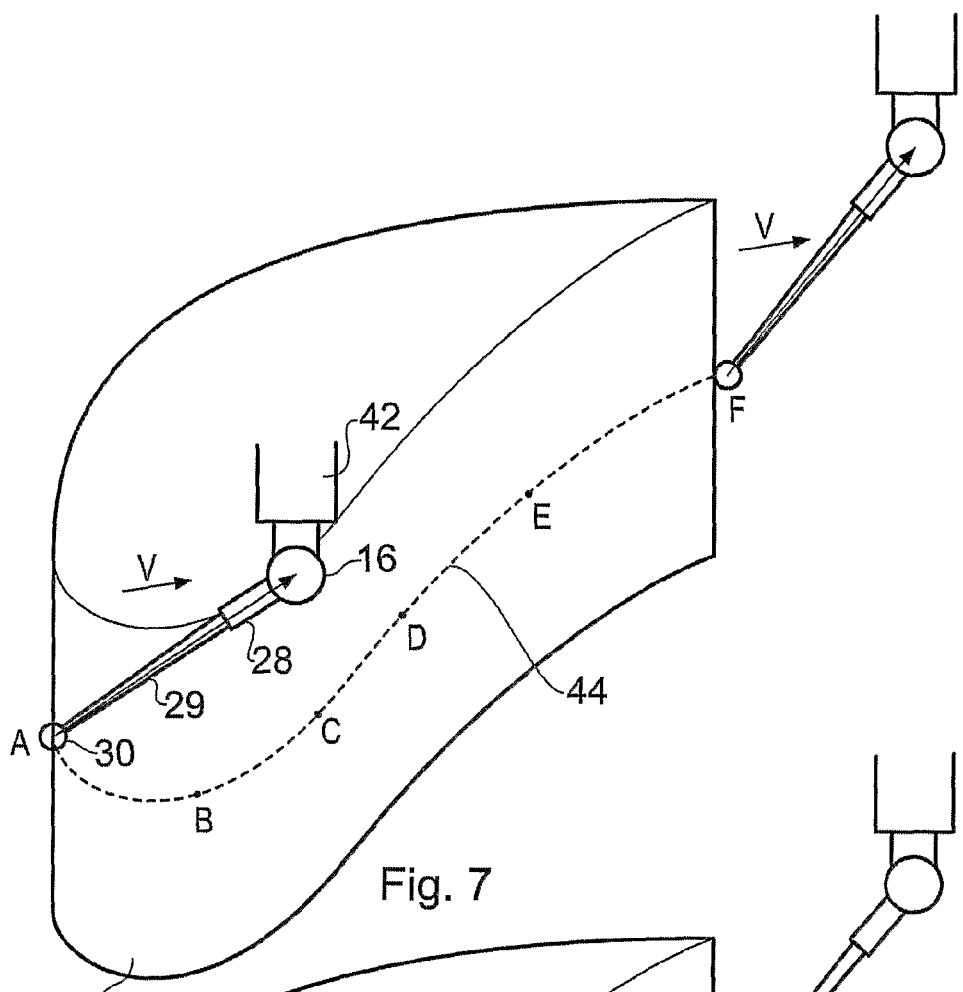
FIG. 7 is a perspective view of a turbine blade illustrating the stylus tip position and head angles at different positions.

FIG. 7 is a perspective view of a turbine blade and is used to show how the scanning path is determined. Two parts along the desired scan path A and F are chosen. The stylus tip coordinate position is determined for these two points. This may be determined from CAD data or from measurements of the part. The head vector $\nabla$ which gives the direction between the stylus tip 30 and the quill 42 (either a point on the quill or the intersection of A1 and A2 angles on the head) is also chosen for points A and F. Factors which may be considered when choosing the head vector $\nabla$ are the type of probe being used, access restriction etc. The head vector $\nabla$ relates to the relative rotations about the A1 and A2 axes, and this data can be used interchangeably.

Where there is a large distance between A and F, or where the scan path has a complex shape, the scan path may be divided up into a series of waypoints B,C,D and E. The stylus tip position and head vector may also be chosen for these waypoints.

The stylus tip path can be determined from the waypoints by interpolation or fitting to a function. Alternatively, the stylus tip path can be defined by a function, such as a sinusoidal function along the surface.

Figure 17:
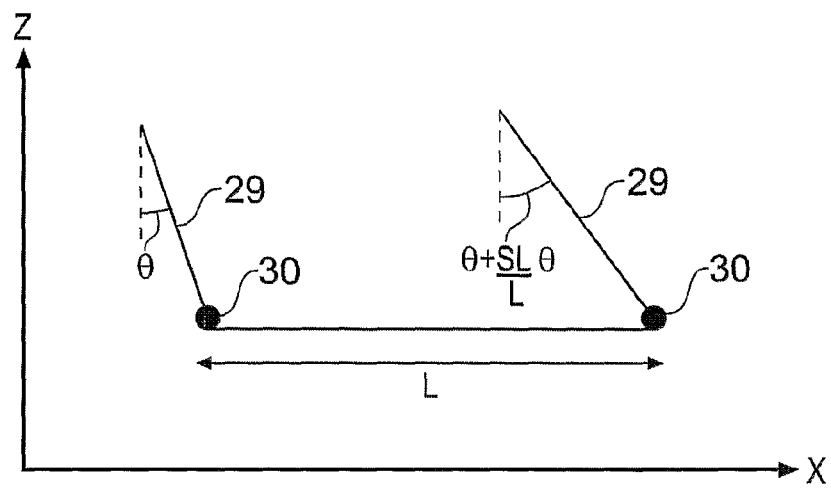
FIG. 17 illustrates the motion of the scanning head during a scan along a straight line.

The motion of the head vector between two points can be described by a function, for example a function which relates the angle of the head vector to distance or time along the profile. FIG. 17 illustrates a scan along a straight line of length L. The angle about the A1 axis at the start of the scan is θ. The change in angle about the A1 axis as the scan progresses may therefore be described by the following function in equation [1].

$$\theta = \theta_s + (\delta L/L)\theta_p \quad [1]$$

where $\theta_s$ is the value of θ at the start of the scan and $\theta_s + \theta_p$ is the desired finish angle.

As the two axes A1 and A2 are orthogonal, the angles θ (about the A1 axis) and φ (about the A2 axis) can be treated separately (i.e. different functions used relating to the two angles). Although FIG. 17 illustrates the linear case, this approach is appropriate for non linear profiles.

Figure 18:
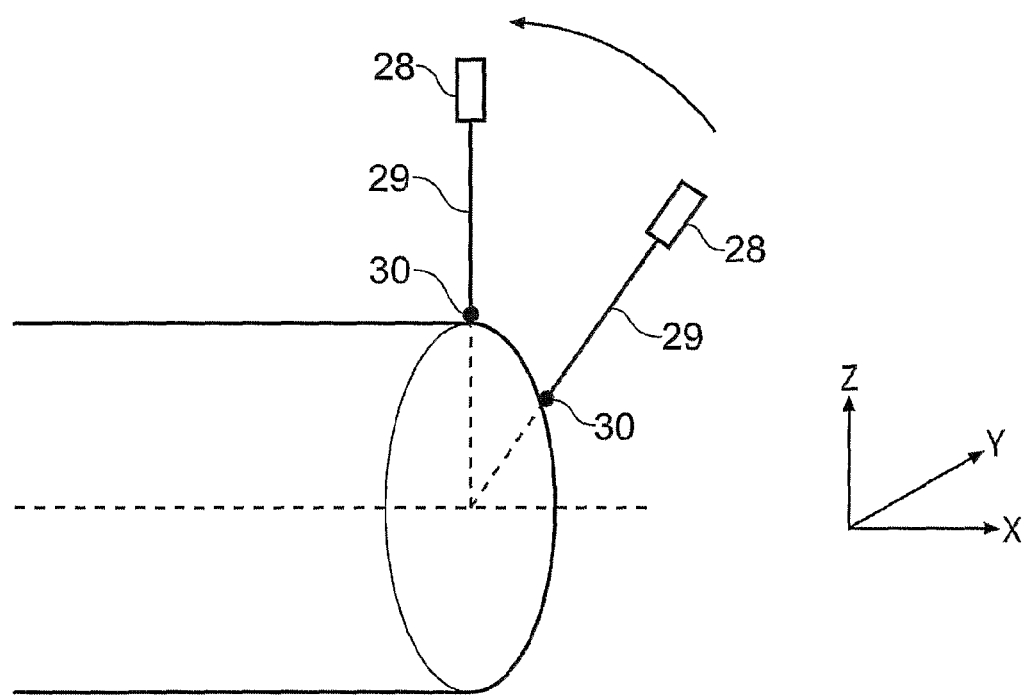
FIG. 18 illustrates the motion of the scanning head during a scan of the external surface of a boss.

The vector motion can also be fitted to a pre-determined equation which relates the vector motion to the features being measured. FIG. 18 illustrates a scan of an external surface of a horizontal boss 110. In this case it is desirable that the vector motion describes a circle, with the probe 28 kept with its longitudinal axis aligned with the surface normal. The head angles can be described by the following equations:

$$\theta = \sin \omega t \quad [2]$$

$$\phi = \cos \omega t \quad [3]$$

where $\omega$ is the rotational speed of the stylus tip.

These equations are appropriate when both head are required to generate circular motion. For a vertical boss, the vector only needs to be rotated about the A1 axis, so the equations can be simplified accordingly. Other equations may be derived for head motion which is applicable to other features.

The motion of the head vector may also be determined by interpolation from the head angles at the waypoints.

Once the stylus tip path and scanning head angles have been defined, trajectory of the CMM quill can be determined to move (together with the scanning head) the stylus tip between A and F.

A scanning path may likewise be determined continuously around the turbine blade of FIG. 7 from point A to A, for example.

Figure 8:
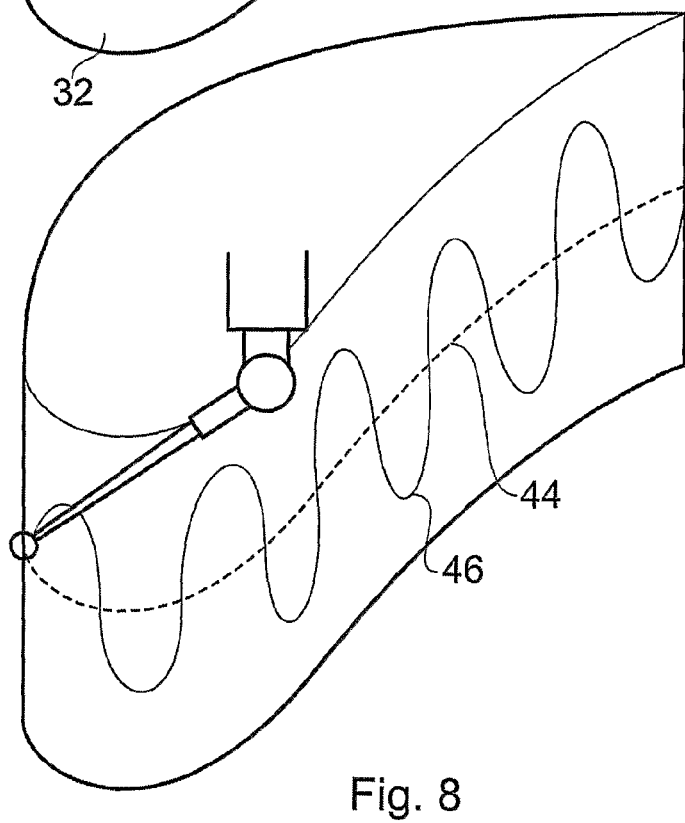
FIG. 8 is a perspective view of a turbine blade illustrating a sweep scan.

FIG. 7 illustrates a line scan 44 around the perimeter of the turbine blade 32. However it is also possible to use the same method to perform a sweep scan as illustrated in FIG. 8. In this case the CMM quill trajectory is determined as before for a central line 44. An oscillating motion is then superimposed on the head motion to produce a sweep scan.

In the scans described in FIGS. 5-8, the motion of the CMM is complex, having non-linear trajectories and velocities. By allowing the CMM quill to move at non-linear velocities and trajectories, more efficient scan profiles can be created. The motorised scanning head can be moved quickly because it has a low mass, low inertia and a high dynamic response. However, high accelerations of the CMM quill can result in machine distortion and thus create measurement errors. Thus it is desirable to minimise CMM quill movement and accelerations and maximise motorised scanning head movement and accelerations in any scan profile. This enables high speed scanning with minimal measurement errors.

Figure 16:
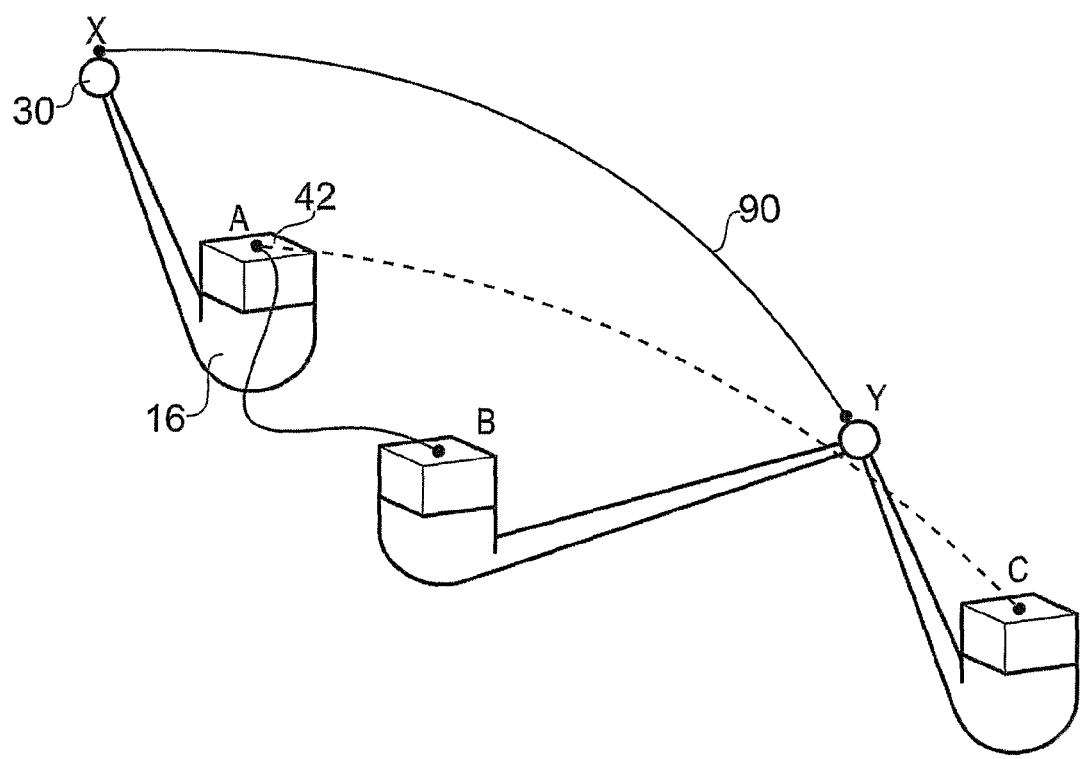
FIG. 16 is a schematic illustration of two schemes for scanning a line XY.

FIG. 16 illustrates two possible CMM quill trajectories for scanning a path 90 between X and Y. The line AC shows the trajectory of the CMM quill if the scanning head angles are kept fixed between X and Y. The line AB shows the trajectory of the CMM quill if the scanning head angles are changed between X and Y. The trajectory AB has minimised and simplified the movement of the CMM quill.

Figure 9:
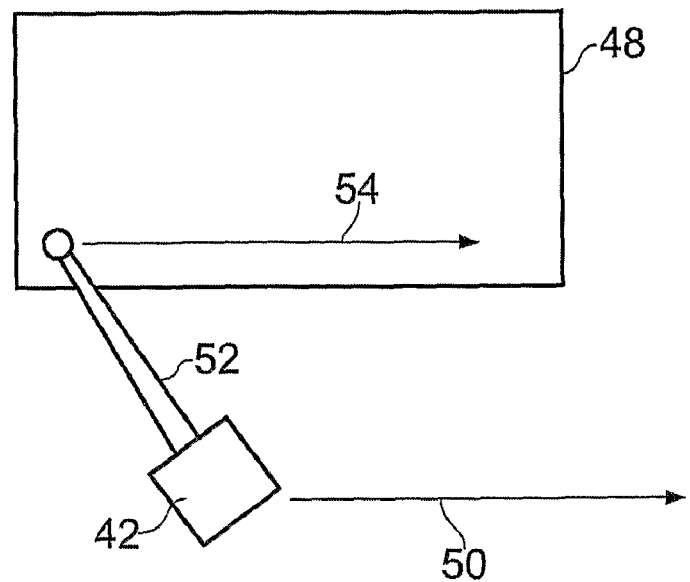
FIG. 9 is a plan view of a straight line scanning path of traditional methods.

FIG. 9 illustrates a traditional method of scanning a straight line of a part 48. The CMM quill 42 is moved in a straight line trajectory 50, dragging the probe 52 in a straight line 54.

Figure 10:
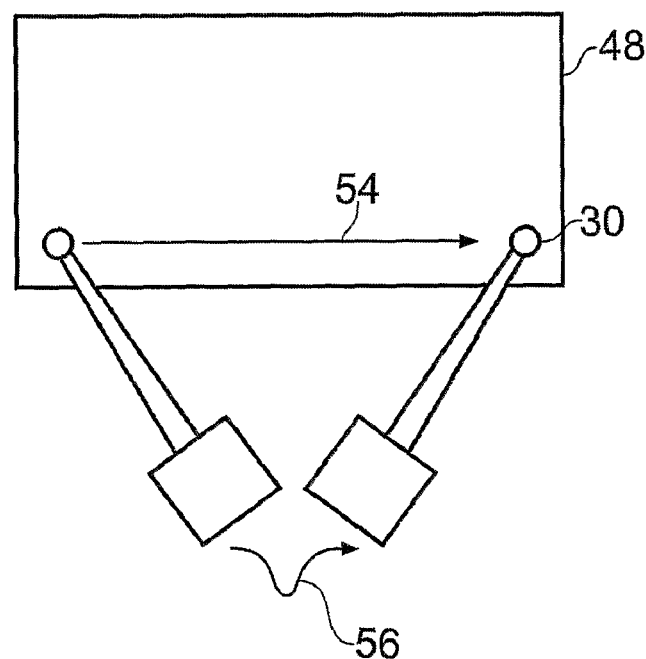
FIG. 10 is a plan view of a straight line being scanning according to the present invention.

FIG. 10 illustrates another method of scanning the straight line 54, according to the present invention. In this method the motorised scanning head 16 rotates about its A1 axis whilst the CMM quill follow a locus 56 which moves backward and forwards in two back to back curves. In order to achieve the linear movement of the stylus tip 30, movement of both the motorised scanning head and the CMM quill is used. However, movement of the motorised scanning head is maximised whilst movement of the CMM quill is minimised, thus allowing this scan to be achieved at high speed with minimum measurement errors resulting.

As before this scan profile is generated by determining the desired stylus tip positions and head angles and using this data to calculate the CMM quill positions required.

This method can be used to measure square parts very quickly. If appropriate, the stylus length and scanning head angles may be chosen to minimise movement of the CMM quill.

Figure 15:
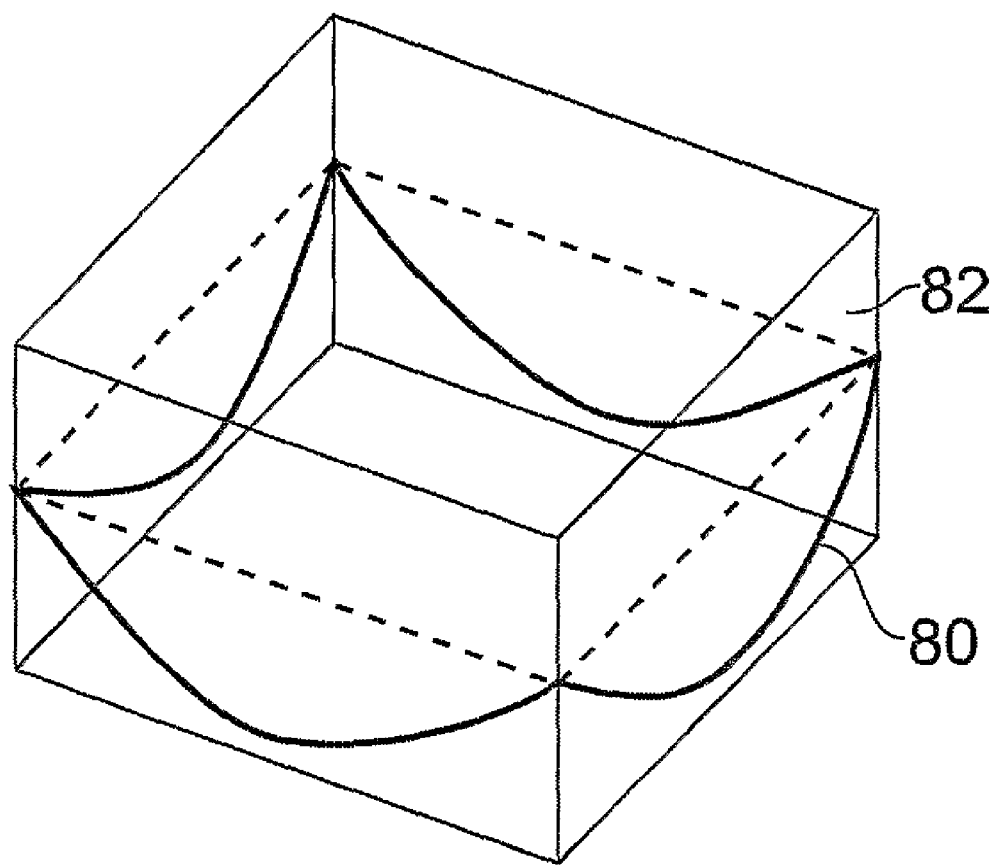
FIG. 15 illustrates a perspective view of a scan profile of the internal surface of a square.

FIG. 15 illustrates the scan profile 80 of the internal surface of a square profile 82 taken with the quill stationary and movement provided by the scanning head. The stylus tip sweeps through an arc. The measurement data can be projected onto a plane, however in some cases it is desirable if the actual measurement data is taken on a plane. This is possible if the quill moves vertically to make the stylus tip follow straight lines. By using the method of the present invention, a square profile can be effectively measured by selecting the measurement profile of the probe (i.e. a square), selecting the head angles required during the scan (360° rotation) and thereby calculating the required movement of the CMM. The dashed line 81 illustrates the new stylus tip path.

Figure 23:
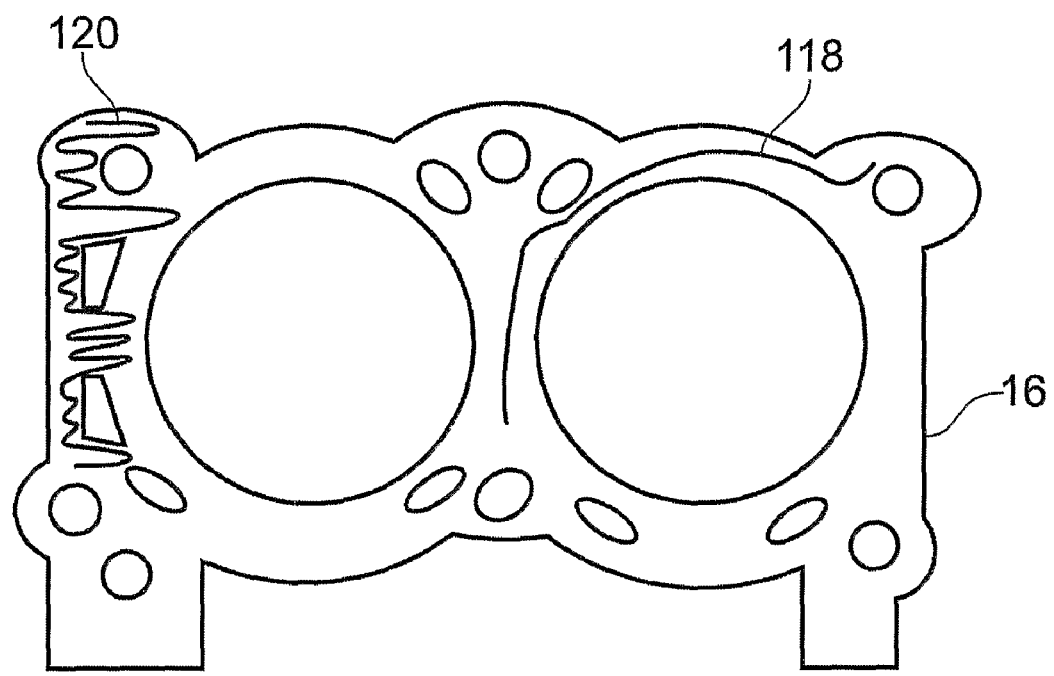
FIG. 23 is a plan view of a gasket being measured.

FIG. 23 is a plan view of a gasket 116. The present invention is suitable for measuring parts such as gaskets as the stylus tip follows a defined path. In this method there is not the risk of the stylus tip following an erroneous path into a hole, as in conventional techniques in which the CMM path is chosen, rather than the stylus tip path. FIG. 23 shows both a line path 118 and a sweep path 120 which may be used to measure the gasket 116.

Figure 11:
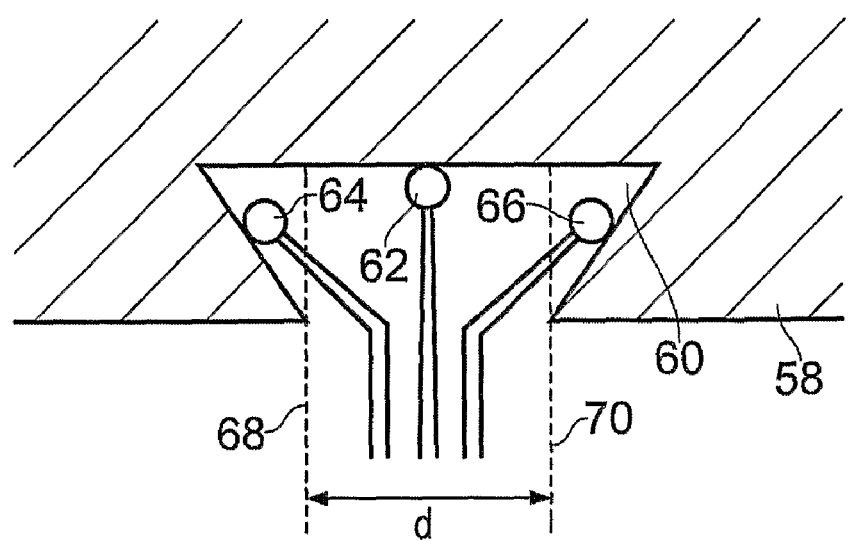
FIG. 11 illustrates a recess being measured by traditional methods.

The present invention has the advantage that it enables scanning of parts which are difficult to access, for example recessed parts. FIG. 11 shows a part 58 having a recess 60 which is difficult to measure using conventional means. To measure this part conventionally, three styli 62, 64, 66 need to be used. The central portion shown between two dotted lines 68, 70 can be measured using a straight stylus 62, a first cranked stylus 64 is used to measure the side and bottom portion to one side of the dotted line 68. The size of the cranked stylus 64 is limited by the dimensions d of the opening and it is thus limited in how much of the bottom surface it can measure. A second cranked stylus 66 angled 180° to the first cranked stylus 64 is used to measure the side and bottom on the side of the other dotted line 70. Thus at least three stages are required in measuring this recess 60.

Figure 12:
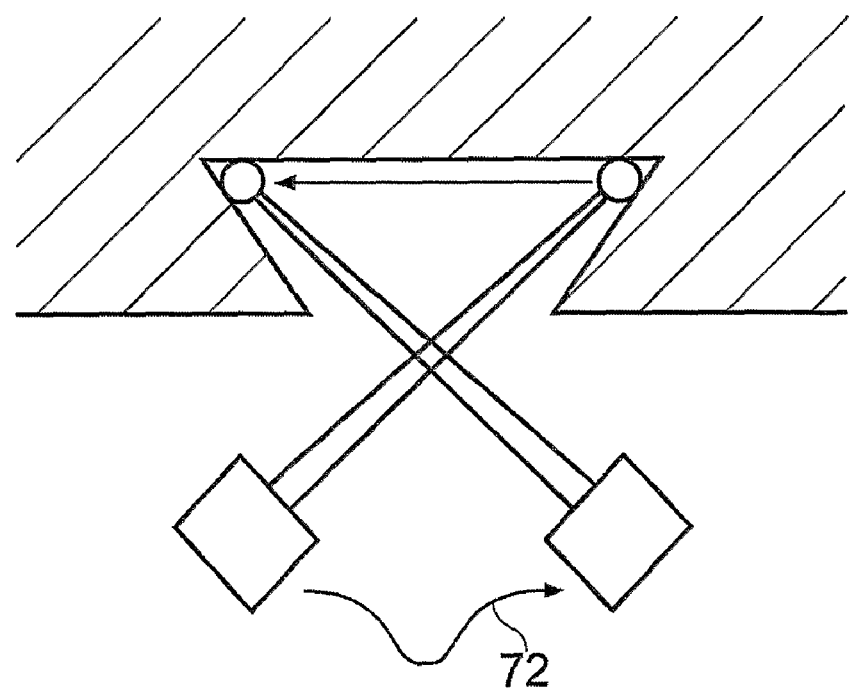
FIG. 12 illustrates a recess being measured according to the present invention.

Using the present invention this recess 60 can be measured in a single stage as illustrated in FIG. 12. The stylus tip position, head angle and CMM quill position are all adjusted throughout the scan to enable all three surfaces of the recess to be measured. As before the desired stylus tip position and head angle are used to calculate the required CMM quill position.

The CMM locus 72 followed by the quill whilst the bottom of the recess is being measured is shown. The example in FIG. 12 illustrates access problems of complex parts, such as a blisk, for example.

Figure 13:
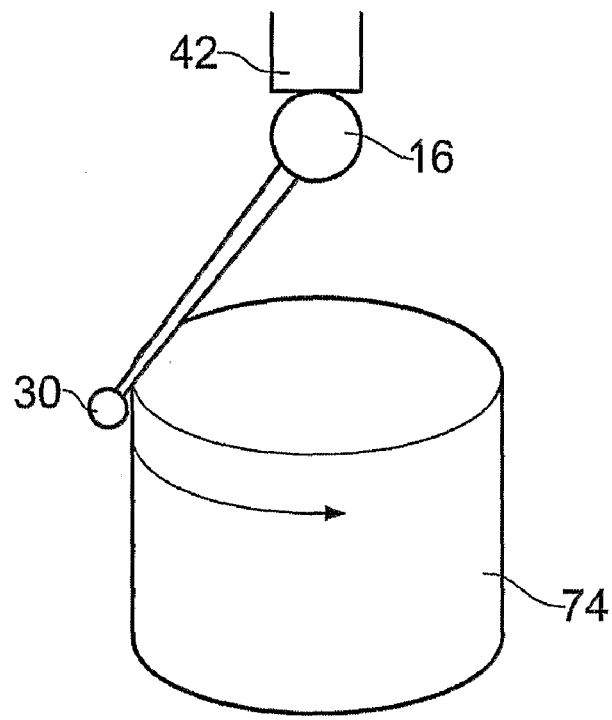
FIG. 13 is a perspective view of a boss being measured with a scanning head aligned with the axis of the boss.

FIG. 13 illustrates a boss 74 the external surface of which is to be measured. The quill 42 of the CMM is aligned with the centre line of the boss. The motorised scanning head 16 is then rotated about the A1 axis so the stylus tip 30 performs a measurement of the circumference towards the top of the boss. However this method has the disadvantage that it cannot be repeated further down the boss, as the tip 30 will no longer be able to contact the surface.

Figure 14:
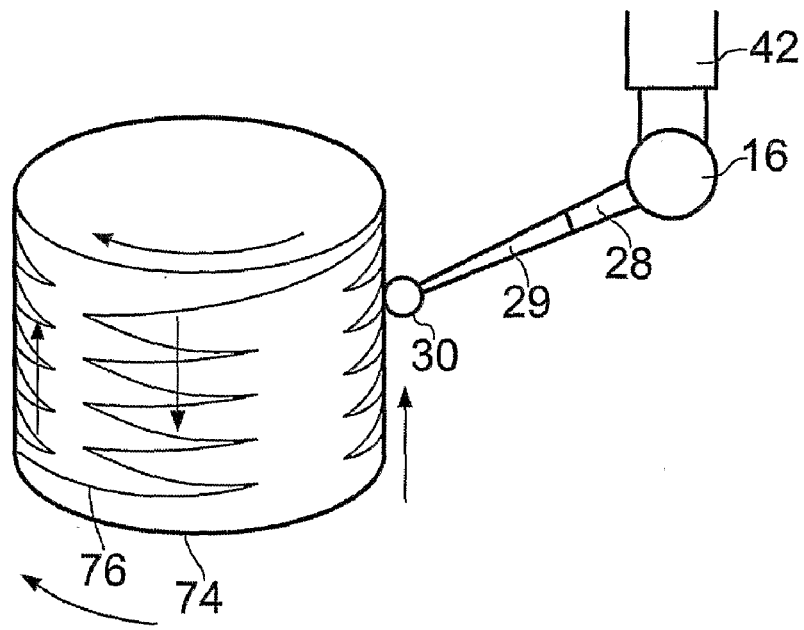
FIG. 14 illustrates the perspective view of a boss divided into segments.

FIG. 14 shows an alternative method for scanning a boss 74. In this method the external surface of the boss 74 is divided into sections, for example four. The external surface of the boss 74 may be measured continuously by performing a sweep scan up one section, moving the stylus tip to the next section and then performing a sweep scan of that section down etc as shown by line 76. The top of the boss may also be scanned in the scan profile, for example by performing a sweep scan (not shown). As the stylus tip 30 moves from section to section, it does not leave the surface. The scan profile is determined as before by choosing the stylus tip position and head angles, and using these to determine the CMM quill position.

Alternatively, each section could be scanned in one direction (e.g. upwards), with the stylus tip tracing the surface in the opposite direction (e.g. downwards) between sections. Alternatively the stylus tip may leave the surface between sections.

This method is also suitable for horizontal bosses.

Although the embodiments above describe a contact probe for scanning a surface profile, the surface profile may also be measured by taking touch points. In this case the measurement probe is used to take discrete measurement positions of the surface profile.

Figure 19:
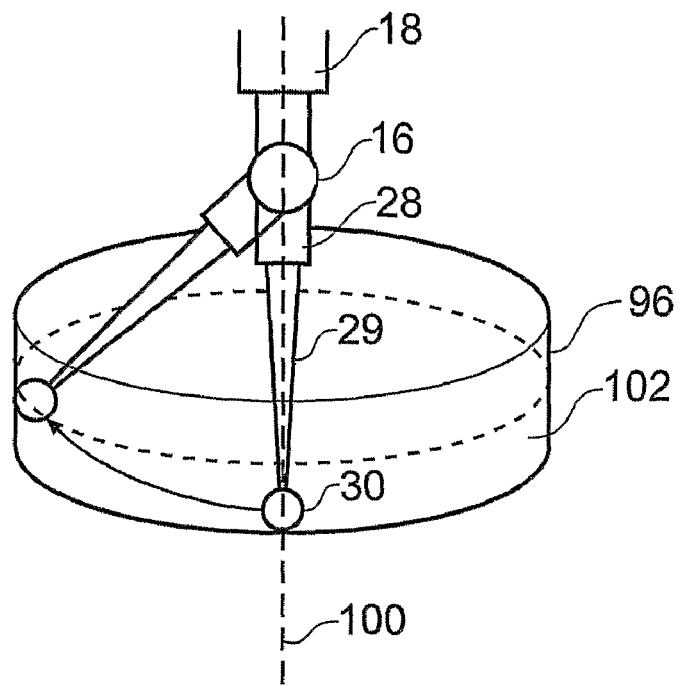
FIG. 19 is a perspective view of a bore being measured by a conventional touch trigger technique.
Figure 20:
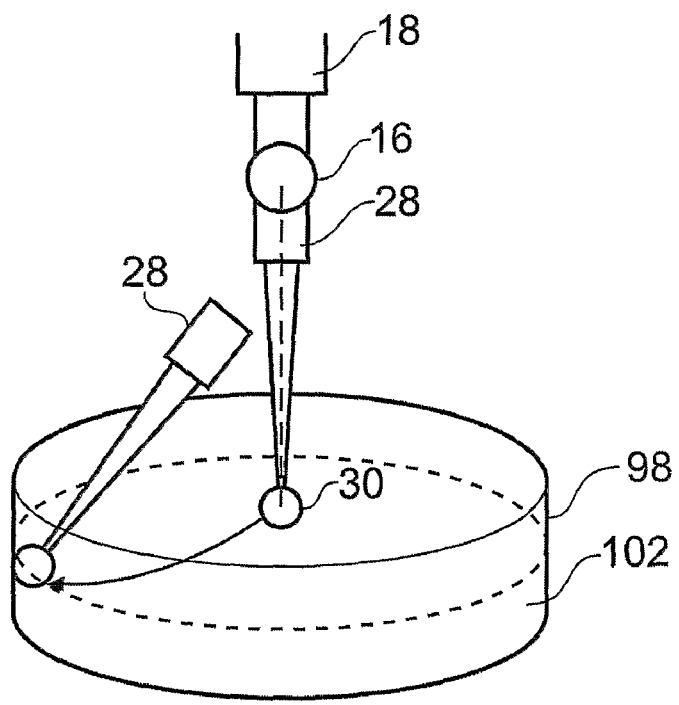
FIG. 20 is a perspective view of the bore of FIG. 17 being measured by a method of the present invention.

FIG. 19 shows a bore 96 being measured by conventional techniques and FIG. 20 illustrates a shallow bore 98 being measured by the method of the present invention. As illustrated in FIG. 19, a conventional method of taking discrete measurement points of the inner surface of the bore would be to use the quill 18 to position the scanning head 16 along the centre line 100 with the stylus tip 30 below the plane 102 in which the measurement points are to be taken. The head angles are then adjusted to bring the stylus tip into contact with the surface. However, this method is not possible for a very shallow blind bore as the stylus tip cannot be positioned below the plane of the measurement points due to access restrictions. In the present invention, illustrated in FIG. 20, both the quill 18 and probe angles are moved to enable the stylus tip 30 to be brought into contact with the inner surface of the bore without the need to bring the stylus tip below the plane 102 of the measurement points. This is achieved by choosing the stylus tip path and head angles as previously described.

The embodiments described above all describe motion using 5 axes, i.e. three linear CMM axes and two rotary scanning head axes. It may be advantageous in some cases to change from 5 axis motion to motion in which motion in one or more axis is frozen, for example using only the motion of the CMM (3 axis) or only the motion of the scanning head (2 axis).

Figure 21:
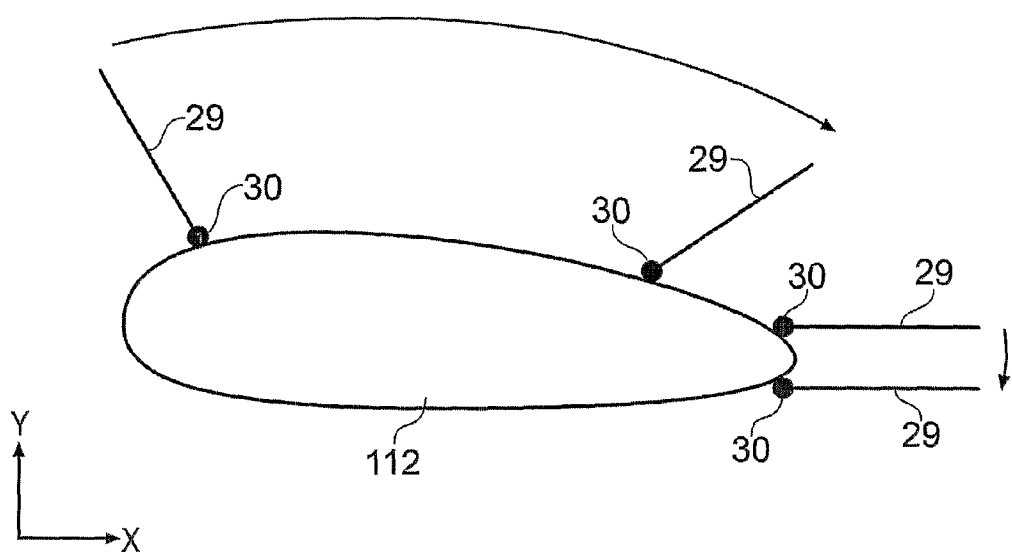
FIG. 21 is a plan view in XY of a turbine blade being measured.

FIG. 21 is a plan view of a turbine blade 112 shown in the XY plane. On the long side of the blade, the path is planned to give a transition between pushing and dragging the head, which results in a smooth motion of the CMM. At the narrow end, the head vector is chosen such that it remains fixed as the narrow end is scanned. This has the advantage that the resulting CMM motion is minimised. Additionally, adjustment of the head angles to keep the probe in its deflection range is not hampered by a required change in head vectors over this sharp feature.

Figure 22:
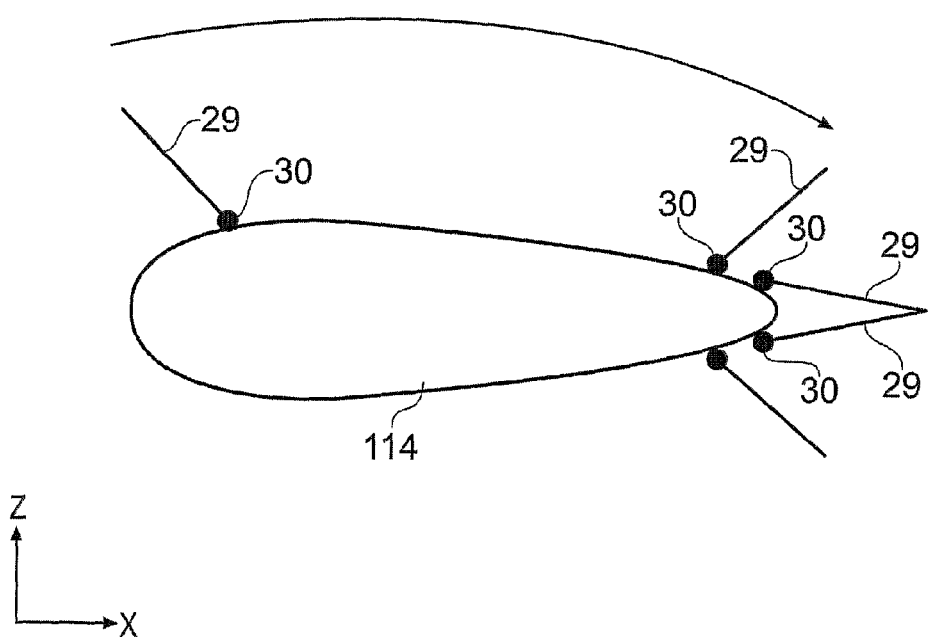
FIG. 22 is a plan view in XZ of a turbine blade being measured.

FIG. 22 is a plan view of a turbine blade 114 shown in the XZ plane. As in FIG. 21, the long side of the blade has a measurement path with a scanning head transition between pushing and dragging. At the narrow end, the head vector is chosen so that the narrow end can be measured by motion of the scanning head only, with the CMM quill remaining stationary. This has the advantage that the quill motion is minimised for this complex feature.

The embodiments described above are all suitable for planning a measurement path on a part. This may either be done online, for example by using a joystick to control the scanning head and CMM to thereby take discrete points on the surface having the desired stylus tip position and head angles. The data for these discrete points may be stored in memory and/or used to derive the measurement path of the stylus tip, scanning head and CMM quill.

Alternatively, the measurement path may be planned offline, for example on a CAD model. In this case the measurement profile along the surface which the stylus tip will follow and the head angles are selected on the CAD model. This data is stored in memory and/or used to derive the measurement path of the stylus tip, scanning head and CMM quill.

Whether the measurement path has been created on line (i.e. with a joystick) or off line (e.g. on a CAD model), the measurement path data is converted into command code which sends position demand codes to the CMM and scanning head to follow the desired measurement paths when measuring a part.

During the measurement of the part, the probe must be kept within its deflection range (and non contact probes must be kept within their working range). This is achieved by deviating the scanning head from its prescribed motion. The scanning head is served along a target vector to maintain the probe within its range. Typically this target vector is normal to the surface. However, factors such as the orientation of the probe, friction or the requirement to stay on a required profile may cause a different target vector to be chosen. Calculated tip position, historic surface points used to project forwards etc may be used to determine the target vector.

The CMM quill path may be modified to keep the stylus tip in a defined plane. For example, if the head angle is served to keep the probe within its deflection range, the stylus tip may move away from the defined surface plane of the measurement path. The change in stylus position is used to determine the distance the stylus tip has moved off plane and the CMM can be driven accordingly to bring the stylus tip back on plane.

Although the embodiments above describe the use of a contact probe, these scanning methods are also suitable for use with a non-contact probe, for example an optical, inductance or capacitance probe. For an optical probe, the light spot on the surface may be treated as equivalent to the stylus tip position, for example. For inductance or capacitance probes, an offset may be treated as equivalent to the stylus tip position. For both contact and non contact probes, the stylus tip is effectively a pivot point about which the probe may be orientated and still measure the same coordinate position.

The invention claimed is:

1. A method for measuring a surface using a surface sensing device mounted on a scanning head on a member of a coordinate positioning apparatus, wherein the coordinate positioning apparatus is operated to produce relative movement between the scanning head and the surface, and the scanning head includes a drive for producing rotational movement of the surface sensing device about one or more axes, the method comprising:

(a) determining a desired measurement profile on the surface which the surface sensing device will track;

(b) determining a desired motion of orientation of the surface sensing device, wherein the orientation varies relative to the surface as the surface sensing device follows the desired measurement profile;

(c) using the desired measurement profile and the desired motion of the orientation thus determined to derive a required path of a relative motion between the member of the coordinate positioning apparatus and the surface, such that the surface sensing device prescribes a trajectory along the measurement profile to measure the surface.

2. A method according to claim 1, wherein the measurement profile of the surface sensing device is linear.

3. A method according to claim 1, wherein the measurement profile of the surface sensing device is non linear.

4. A method according to claim 1, wherein the motion of the orientation of the surface sensing device comprises a function which determines the orientation during the motion of the surface sensing device along the measurement profile.

5. A method according to claim 1, wherein motion of the orientation of the surface sensing device is determined by defining the orientation at discrete points along the measurement profile and interpolating between them.

6. A method according to claim 1, wherein the orientation of the surface sensing device is chosen to position the surface sensing device so that it trails behind the head, is pushed ahead of the head or is aligned with the surface normal.

7. A method according to claim 6, wherein there is a transition from one type of orientation to another.

8. A method according to claim 1, wherein the measurement profile on the surface and the motion of the orientation of the surface sensing device are chosen to provide a desired relative motion between the member of the coordinate positioning apparatus and the surface.

9. A method according to claim 1, wherein the measurement profile on the surface is determined by determining two or more discrete measurement points on the surface.

10. A method according to claim 1, wherein the measurement profile on the surface is defined by a function.

11. A method according to claim 1, wherein motion in at least one axis is frozen during part of measurement profile.

12. A method according to claim 11, wherein the motion of the scanning head is frozen during part of the measurement profile.

13. A method according to claim 11, wherein the motion of the coordinate positioning machine is frozen during part of the measurement profile.

14. A method according to claim 1, wherein rotational movement about at least one axis of the scanning head is used to keep the surface sensing device within its measurement range.

15. A method according to claim 14, wherein the scanning head is servoed along a target vector to keep the surface sensing device within its measurement range.

16. A method according to claim 1, wherein the relative motion between the member of the coordinate positioning apparatus and the surface is used to keep the surface sensing device tracking along a desired plane of the surface.

17. A non-transitory computer readable medium storing a computer program for programming a measurement path for a surface sensing device mounted on a scanning head on a member of a coordinate positioning apparatus, wherein the coordinate positioning apparatus is operated to produce relative movement between the scanning head and the surface, and the scanning head includes a drive for producing rotational movement of the surface sensing device about one or more axis, the computer program comprising code that causes a computer perform, when executed,:
  (a) determining a desired measurement profile on the surface which the surface sensing device will track;
  (b) determining a desired motion of orientation of the surface sensing device, wherein the orientation varies relative to the surface as the surface sensing device follows the desired measurement profile; and
  (c) using the desired measurement profile and the desired motion of the orientation thus determined to derive a required path of a relative motion between the member of the coordinate positioning apparatus and the surface, such that the surface sensing device prescribes a trajectory along the measurement profile to measure the surface.

18. An apparatus for measuring a surface profile using a surface sensing device mounted on a scanning head on a member of a coordinate positioning apparatus, wherein the coordinate positioning apparatus is operated to produce relative movement between the scanning head and the surface, and the scanning head includes a drive for producing rotational movement of the surface sensing device about one or more axes, the apparatus comprising:
  a computer having a computer program stored in the computer, the computer program, when executed, causing the computer to:
  (a) determine a desired measurement profile on the surface which the surface sensing device will follow;
  (b) determine the desired motion of orientation of the surface sensing device as the surface sensing device follows the desired measurement profile; and
  (c) uses the desired measurement profile and the desired motion of the orientation thus determined to derive a required path of the relative motion between the member of the coordinate positioning apparatus and the surface, such that the surface sensing device prescribes a trajectory along the measurement profile to measure the surface.

* * * * *